(12) United States Patent
Qi et al.

(10) Patent No.: US 7,973,725 B2
(45) Date of Patent: Jul. 5, 2011

(54) MOBILE WIRELESS COMMUNICATIONS DEVICE WITH SELECTIVE LOAD SWITCHING FOR ANTENNAS AND RELATED METHODS

(75) Inventors: Yihong Qi, St. Agatha (CA); Ying Tong Man, Waterloo (CA); Perry Jarmuszewski, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 488 days.

(21) Appl. No.: 12/115,646

(22) Filed: May 6, 2008

(65) Prior Publication Data
US 2009/0219216 A1 Sep. 3, 2009

Related U.S. Application Data

(60) Provisional application No. 61/032,563, filed on Feb. 29, 2008.

(51) Int. Cl.
*H01Q 1/24* (2006.01)
(52) U.S. Cl. ........................................ 343/702; 343/876
(58) Field of Classification Search .................. 343/702, 343/876
See application file for complete search history.

(56) References Cited

U.S. PATENT DOCUMENTS

| | | | | |
|---|---|---|---|---|
| 4,051,475 | A * | 9/1977 | Campbell | 370/278 |
| 5,923,305 | A | 7/1999 | Sadler et al. | 343/895 |
| 6,765,536 | B2 | 7/2004 | Phillips et al. | 343/702 |
| 6,920,315 | B1 | 7/2005 | Wilcox et al. | 455/121 |
| 7,132,989 | B1 | 11/2006 | Poilasne | 343/745 |
| 7,301,502 | B2 | 11/2007 | Sinasi et al. | 343/702 |
| 2005/0245207 | A1 | 11/2005 | Suzuki et al. | 455/101 |
| 2006/0073837 | A1* | 4/2006 | Tanaka et al. | 455/453 |
| 2008/0253345 | A1* | 10/2008 | Sanguinetti | 370/339 |
| 2010/0127945 | A1* | 5/2010 | Rousu et al. | 343/745 |

FOREIGN PATENT DOCUMENTS

| | | |
|---|---|---|
| GB | 2396273 A | 6/2004 |
| WO | WO 99/08395 | 2/1999 |
| WO | WO 2006/105185 A2 | 10/2006 |

* cited by examiner

*Primary Examiner* — Tho G Phan
(74) *Attorney, Agent, or Firm* — Allen, Dyer, Doppelt, Milbrath & Gilchrist, P.A.

(57) ABSTRACT

A mobile wireless communications device may include a plurality of antennas, a plurality of wireless transceivers, and signal processing circuitry. The device may further include a controller for selectively switching the signal processing circuitry to a desired one of the wireless transceivers, and for selectively switching a desired one of the antennas to the desired one of the wireless transceivers. Moreover, the controller may also be for selectively connecting and disconnecting the at least one other one of the antennas to an unused one of the wireless transceivers.

23 Claims, 4 Drawing Sheets

MOBILE WIRELESS COMMUNICATIONS DEVICE WITH SELECTIVE LOAD SWITCHING FOR ANTENNAS AND RELATED METHODS

CROSS-REFERENCE TO RELATED APPLICATIONS

This application is based upon prior filed provisional application No. 61/032,563 filed Feb. 29, 2008, the entire subject matter of which is incorporated herein by reference in its entirety.

FIELD OF THE INVENTION

The present invention relates to the field of communications devices, and, more particularly, to mobile wireless communications devices and antennas therefor and related methods.

BACKGROUND OF THE INVENTION

Cellular communications systems continue to grow in popularity and have become an integral part of both personal and business communications. Cellular telephones allow users to place and receive voice calls most anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Even so, as the functionality of cellular communications devices continues to increase, so too does the demand for smaller devices which are easier and more convenient for users to carry. One challenge this poses for cellular device manufacturers is designing antennas that provide desired operating characteristics within the relatively limited amount of space available for the antenna.

One approach for reducing phone size is to use flip phones having top and bottom housings connected with a hinge. The housings may be closed when the phone is not in use so that it is more compact and easier for a user to carry. One exemplary antenna system for a flip style cellular phone is described in U.S. Pat. No. 6,765,536. In particular, the antenna system includes an external antenna element carried on the top of the lower housing, and a parasitic element carried by the top housing so that when the phone is flipped open the parasitic element is in close proximity to the antenna element. A tuning circuit carried by the lower housing is electrically coupled to the parasitic element. The tuning circuit is variable to adjust the parasitic load on the antenna element to provide variable operating frequencies and bandwidths for the phone.

External cell phone antennas are advantageous in that they are spaced apart from the user's head, which makes it easier for phone manufacturers to comply with applicable specific absorption rate (SAR) requirements, for example. This is because the farther the radiating element of the cell phone antenna system is from the user, the lower the radiation exposure to the user. Yet, many users prefer internal antennas over external antennas, as external antennas are prone to catch on objects and become damaged, for example. Yet, with the ever increasing trend towards smaller cell phone sizes, for a relatively small phone having an internal antenna, this may place the antenna in relatively close proximity to the user's ear, which may make complying with applicable SAR and/or hearing aid compatibility (HAC) requirements potentially difficult for manufacturers. Further, the reduced space for the antenna may make achieving desired signal characteristics difficult.

One exemplary mobile phone configuration that attempts to address radiation concerns from an internal antenna is set forth in PCT Publication No. WO/2004/021511 A2. The device includes a casing including a first in-built driven antenna element extending a length along a longest side of the casing. Either the portable communication device or the case includes at least one passive beam directive element distanced from and generally extending along at least most of the same length as the first in-built driven antenna element. Because of this, electromagnetic radiation generated by the first in-built driven antenna element is enhanced in a direction away from a side of the casing intended to be facing a user.

Despite the existence of such configurations, further improvements may be desirable in certain applications, particularly where the form factor of the device housing does not provide adequate space for such arrangements. Moreover, as cellular wireless communication systems continue to improve, there is a need for relatively high performance multi-band antennas for operation in EDGE, CDMA and/or WCDMA systems, for example.

DETAILED DESCRIPTION OF THE PREFERRED EMBODIMENTS

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in alternative embodiments.

Generally speaking, a mobile wireless communications device is disclosed herein which may include a plurality of antennas, a plurality of wireless transceivers, and signal processing circuitry. The device may further include a controller for selectively switching the signal processing circuitry to a desired one of the wireless transceivers, and for selectively switching a desired one of the antennas to the desired one of the wireless transceivers. Moreover, the controller may also be for selectively connecting and disconnecting the at least one other one of the antennas to an unused one of the wireless transceivers.

More particularly, the device may further include a plurality of loads, and the controller may therefore also be for selectively switching at least one other one of the antennas to at least one of the loads. By way of example, the plurality of loads may include a plurality of impedance elements. Moreover, the plurality of loads may include a respective set of loads for each of the antennas. Also, the plurality of loads have different loading characteristics Additionally, the device may further include a printed circuit board (PCB) carrying the plurality of wireless transceivers and the plurality of impedance elements.

The device may further include a portable housing, and at least one of the plurality of antennas may be mounted within the portable housing. In some embodiments, at least one of the plurality of antennas may be mounted outside the portable housing. Each of the plurality of antennas may be for operating over a different operating frequency band. Furthermore, at least one of the wireless transceivers comprises a cellular wireless transceiver. Also, the antennas may be connected to a signal ground, and the controller may selectively connect and disconnect the at least one other one of said antennas to the signal ground.

A related method for operating a mobile wireless communications device, such as the one described briefly above, may include selectively switching the signal processing circuitry to a desired one of the wireless transceivers, and selectively switching a desired one of the antennas to the desired one of the wireless transceivers. The method may further include selectively connecting and disconnecting the at least one other one of the antennas to an unused one of the wireless transceivers.

Figure 1:
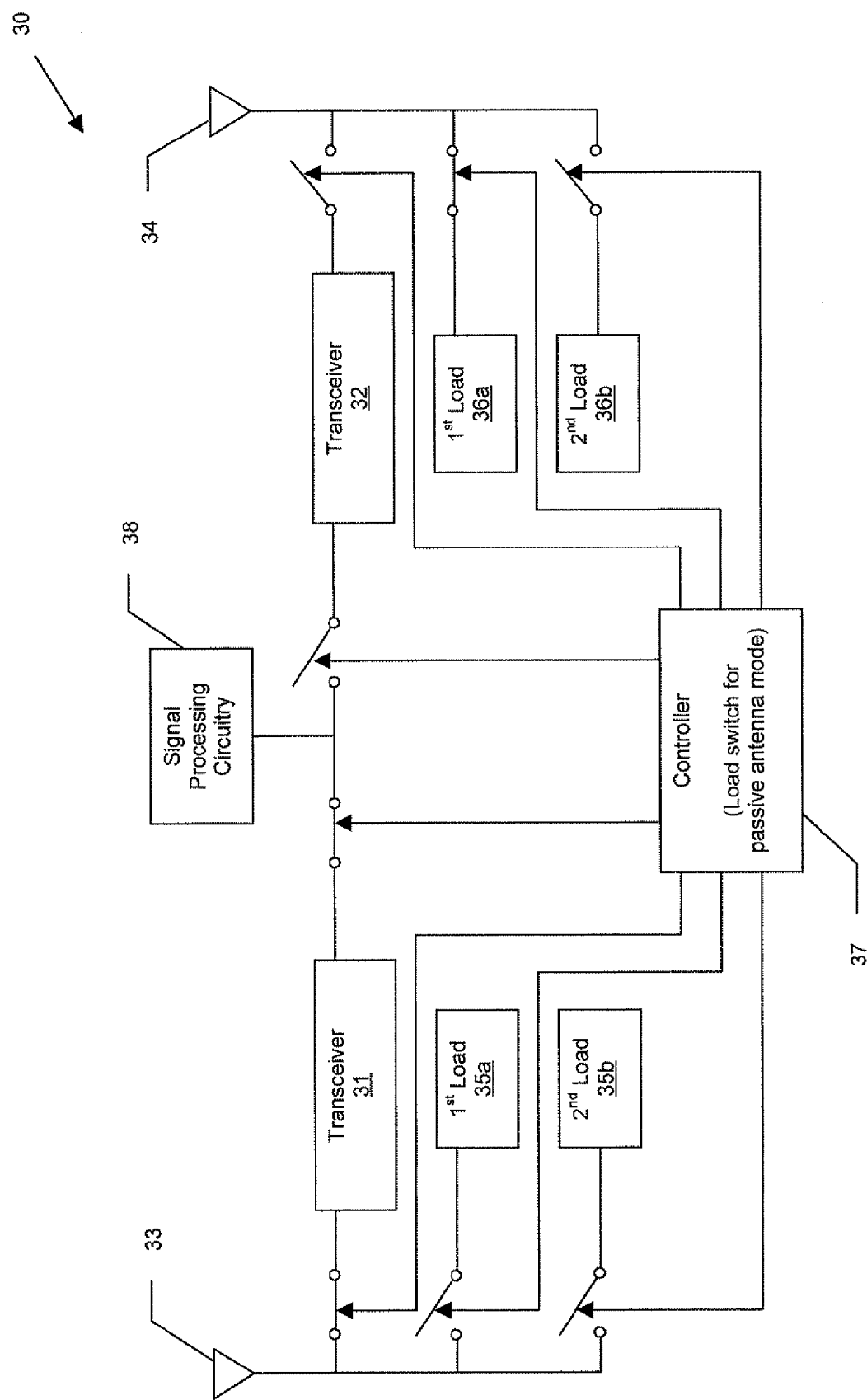
FIG. 1 is schematic block diagram of a mobile wireless communications device in accordance with one exemplary embodiment.
Figure 2:
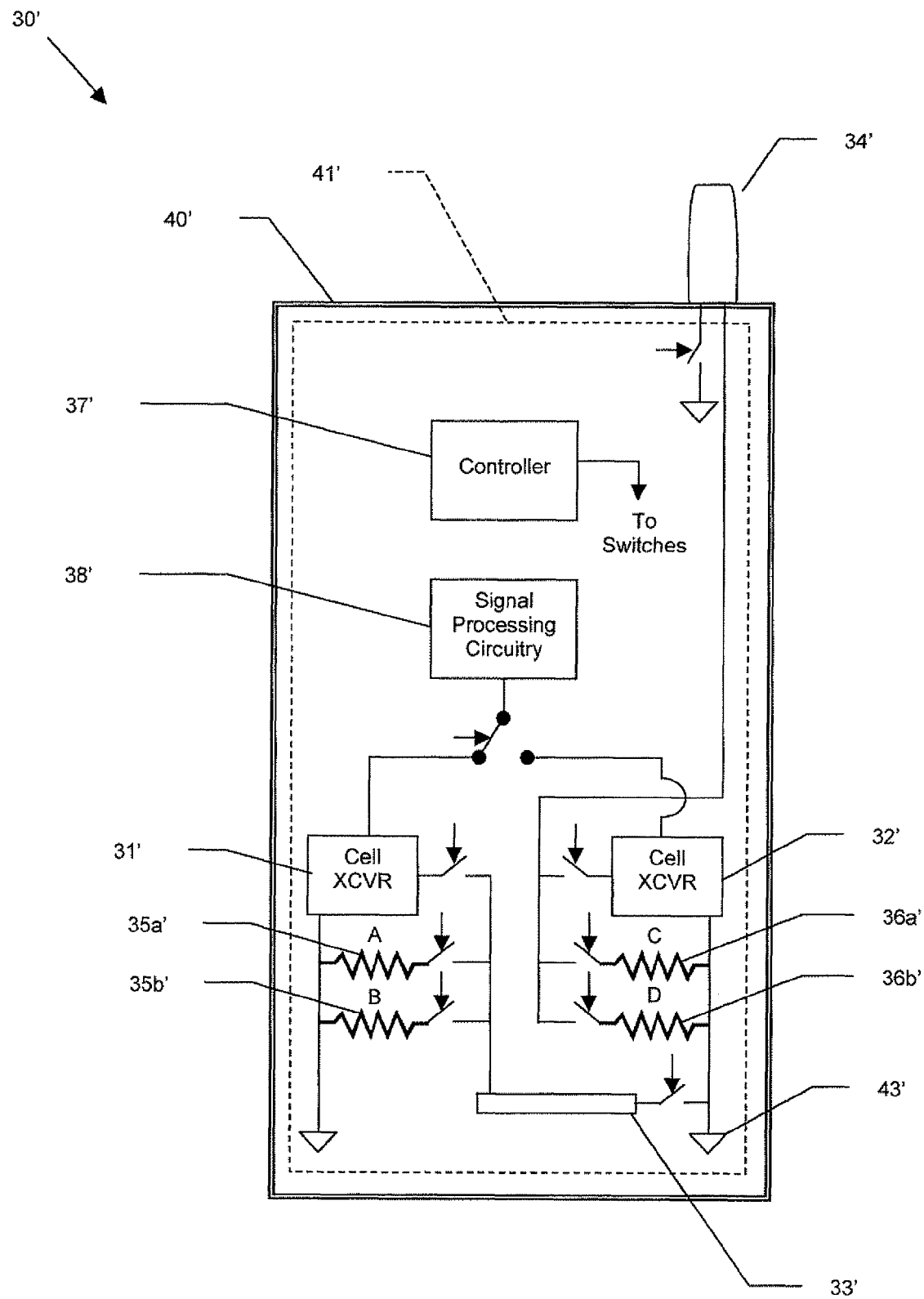
FIG. 2 is schematic block diagram of a cellular implementation of the mobile wireless communications device of FIG. 1.
Figure 3:
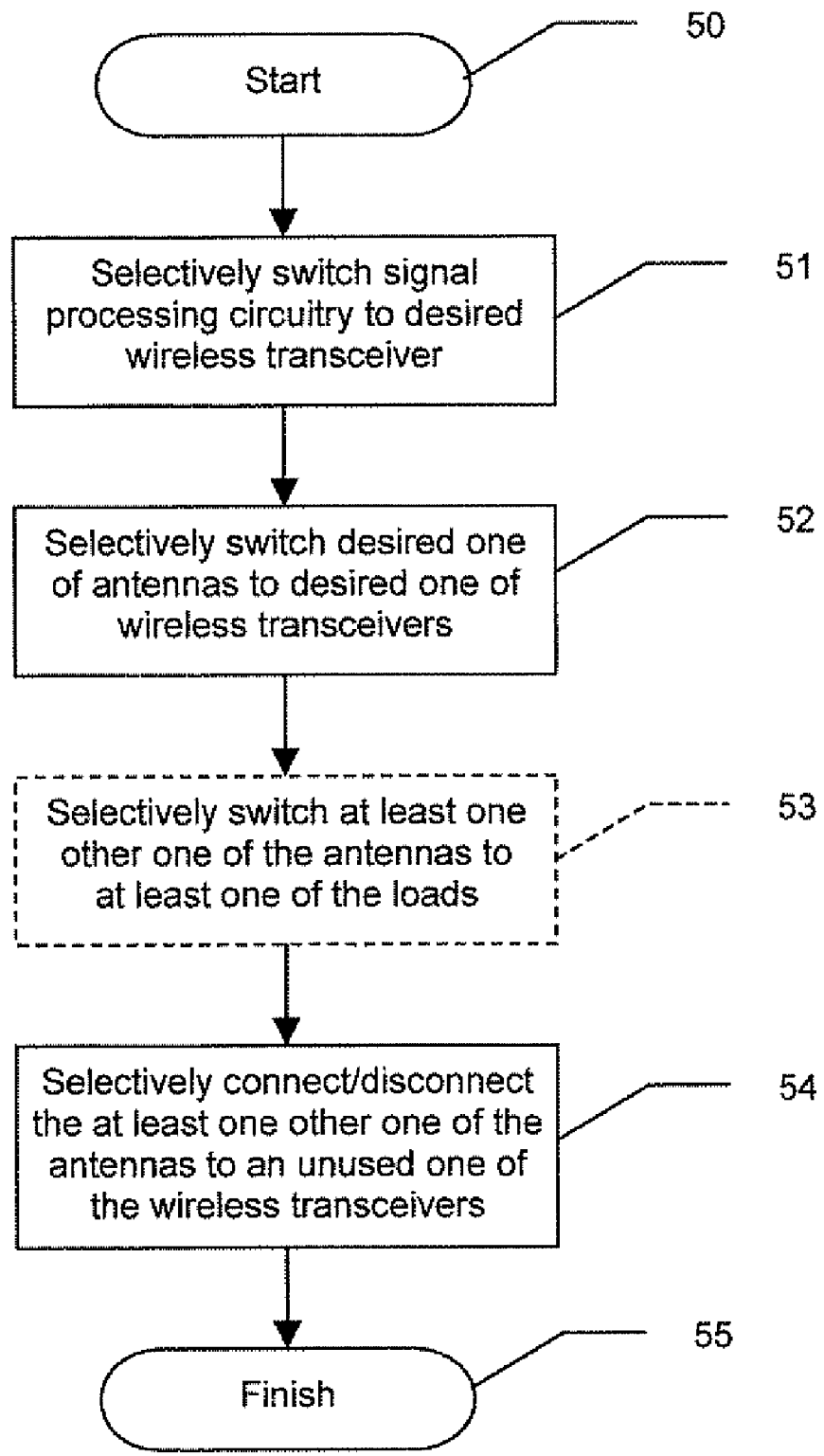
FIG. 3 is a flow diagram illustrating method aspects for using the mobile wireless communications device of FIG. 1.

Referring now to FIGS. 1 through 3, a mobile wireless communications device 30, such as a cellular and/or wireless local area network (WLAN) device, for example, illustratively includes a multi-band antenna system. However, it should be noted that multi-band operation need not be required in all embodiments, and other wireless communications formats may also be used. The antenna system may be conceptually considered as a variable loading multi-band, multi-antenna system in that it may provide relatively wide bandwidth and high system antenna gain by using a non-active antenna element(s) as a passive or parasitic element(s) for an active antenna element(s).

More particularly, the device 30 illustratively includes first and second wireless transceivers 31, 32 (e.g., cellular, WLAN, etc.), each of which has one or more respective antenna elements 33, 34 associated therewith. In the example shown in FIG. 2, the antenna 33' is an internal element and, more particularly, a printed circuit element on a printed circuit board (PCB) 41' within a portable handheld housing 40'. However, such internal elements may take other forms such as flex circuits, and may be carried on an inside surface of the housing 40' within the device 30' instead of the PCB 41', and such internal elements need not be printed conductors in all embodiments (e.g., they may include wires, metal structures, etc.), as will be appreciated by those skilled in the art. In the exemplary embodiment, the antenna 33' is a monopole antenna coupled between the cellular transceiver (XCVR) 31' and a signal ground 43', but other suitable antenna types (e.g., inverted F, etc.) may also be used.

Also in the illustrated example, the antenna 34' is an external antenna. That is, the antenna 34' is at least partially carried on an outer surface of the housing 40'. While both an internal and an external antenna are shown in the example of FIG. 2, it should be noted that various combinations of antenna types may be used, e.g., all of the antennas may be internal, all may be external, or a combination of internal and external antennas may be used.

Additionally, the antenna 33' is illustratively positioned at the bottom of the device 30' (e.g., where the input microphone would typically be located in a cellular phone) to further space the antenna element away from the user's brain and ear for SAR reduction and/or HAC compatibility, respectively. However, the antenna elements 33', 34' may be positioned elsewhere from the locations shown in the exemplary embodiment. The antenna elements 33', 34' may be single or multiple-feed antennas depending upon the given configuration and/or application, as will be appreciated by those skilled in the art.

Beginning at Block 50, a controller 37 selectively switches signal processing circuitry 38 (i.e., the circuitry which processes the information received or to be transmitted) to a desired one of the transceivers 31 and 32 depending upon the given operating configuration, at Block 51. For example, the transceiver/antenna pair 31, 33 may be for operation in a first operating frequency band(s), while the transceiver/antenna pair 32, 34 is for operation in a second (i.e., different) operating frequency band(s), as will be appreciated by those skilled in the art. Thus, by switching between the transceivers 31, 32, the controller 37 causes a respective one of the antenna elements 33, 34 to be the active element (i.e., the main radiating element) and the other to be a passive or parasitic element, as will be appreciated by those skilled in the art. Other dedicated parasitic elements (i.e., not connected to a transceiver) may also be used in some embodiments, if desired.

The controller 37 also selectively switches a desired one of the antennas 33, 34 to a desired one of the wireless transceivers 31, 32, at Block 52. In the illustrated example, the controller 37 switches the antenna 33 to the transceiver 31 and the signal processing circuitry 38, making the antenna 33 the active antenna. However, in some embodiments different antennas could be switched to different transceivers, e.g., either of the antennas 33, 34 could be switched to either of the transceivers 31 or 32, if desired, although this additional switching flexibility is not shown in the drawings for clarity of illustration.

Also associated with each of the antenna elements 33, 34 in the illustrated example are respective sets of first and second loads 35a, 35b and 36a, 36b. The controller 37 further selectively switches either one or both of the first and second loads 35a, 35b to the antenna element 33 when it is in the passive mode, and the same is true for the first and second loads 36a, 36b when the antenna element 34 is in the passive mode, at Block 53. The first and second loads 35a, 35b and 36a, 36b may be suitably designed impedance elements (e.g., RC networks, RL networks, RLC networks, etc.) for the given implementation, for example, although other load configurations are also possible. That is, the first and second loads 35a, 35b and 36a, 36b may be fixed for desired performance with respect to the given operating frequency bands of the antenna elements 34, 33, respectively. In some embodiments, respective sets of loads need not be used for each antenna 33, 34, that is, the loads could be common to both antennas and switched thereto as desired depending upon the given operating mode. Moreover, the loads 35a, 35b and 36a, 36b may optionally be omitted in some embodiments.

In the example illustrated in FIG. 1, the signal processing circuitry 38 is connected to the transceiver 31, which is in turn connected to the antenna 33. Neither of the first or second loads 35a, 35b is connected to the antenna 33 in the illustrated active mode of this antenna, although in some embodiments one or more of the loads could be connected to the active antenna element, as will be appreciated by those skilled in the art. Moreover, with respect to the antenna element 34, which is in the passive mode (i.e., the signal processing circuitry 38 is not connected thereto via the transceiver 32), the first load 36a is connected to the antenna 34 while the second load 36b is not.

In other configurations, the second load 36b may also (or instead) be connected to the antenna element 34. Moreover, the transceiver 32 may also be selectively connected/disconnected as a load for the antenna element 34 in the passive mode, and the same is true for the transceiver 31 and antenna element 33. That is, the controller 37 may optionally selectively switch any of the passive antennas to an unused transceiver as an additional load, if desired, at Block 54, thus concluding the illustrated method (Block 55). Thus, it will be appreciated that different combinations of loads (including the transceivers 31, 32) may be connected to the antenna elements 33, 34 when they are in a passive mode to provide desired flexibility in shaping the signal characteristics of the active (radiating) antenna. Moreover, in some embodiments the antenna elements 33, 34 could be selectively connected/disconnected from ground 43' (see FIG. 2) when in the passive mode to provide a floating beam shaping element for the active antenna element, as will be appreciated by those skilled in the art.

It should be noted that the illustrated example is but one possible embodiment of a variable load passive/active antenna system, and that different numbers of transceivers, passive and active elements, and loads may be used, and that more than one load (or no load) may be connected to a given antenna element at a time. Furthermore, while the loads associated with a given antenna element will typically have different characteristics or values, some loads within the system may have similar values (e.g., the first loads 35a and 36a may have a same load value, etc.), although this need not be the case in all embodiments. In the example illustrated in FIG. 2, all of the loads 35a', 35b', 36a', 36b' have different respective values A, B, C, and D.

Generally speaking, desired performance of the parasitic element(s) may be obtained by switching the loading associated with the parasitic antenna element(s). Again, the transceiver(s) associated with the parasitic antenna element(s) at its off condition (i.e., when in the passive mode) may also be considered as another load for that particular parasitic element. As noted above, the controller 37 causes the parasitic antenna element to become a main or active antenna at a different band when the transceiver switches on, and the other antenna element(s) becomes the passive or parasitic element. The controller 37 may advantageously be implemented with one or more of a microprocessor, digital signal processor (DSP), memory, and/or associated software/computer instructions, for example, as will also be appreciated by those skilled artisan.

The loading selection may be based upon applicable gain and return loss conditions, operating frequency bands, and applicable SAR and/or HAC requirements, as will be further appreciated by those skilled in the art. More particularly, the loads may be tuned or selected to provide desired operating characteristics for a given frequency band based upon the applicable gain/return loss and/or SAR/HAC requirements. Also, it should be noted that while separate loads are shown for each antenna element in the present example for clarity of illustration, the load change between active and passive antenna modes may be accomplished using a single load with a tunable or selectable value.

Figure 4:
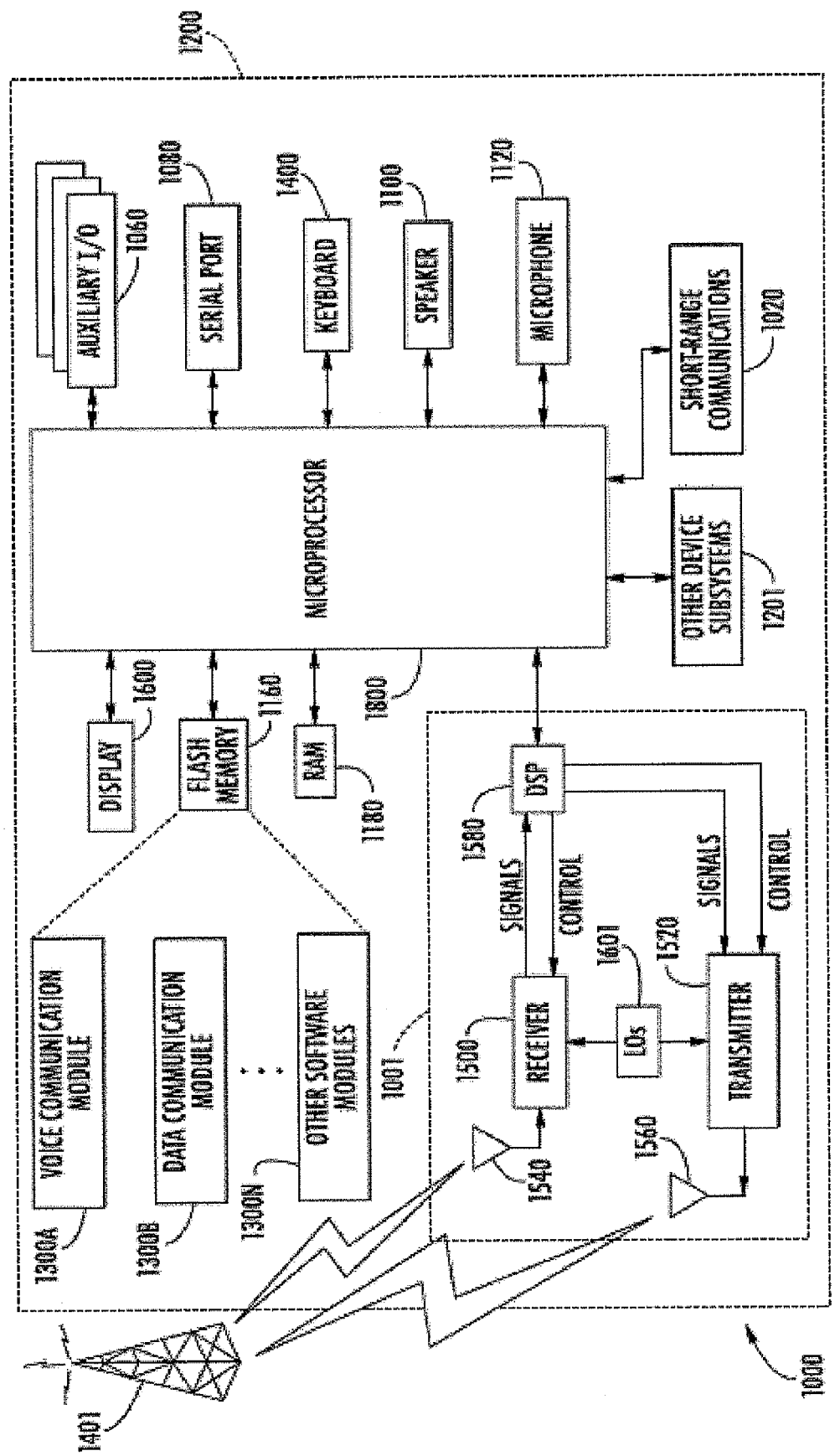
FIG. 4 is a schematic block diagram illustrating additional components that may be included in the mobile wireless communications device of FIG. 1.

Turning to FIG. 4, exemplary components that may be used in the device 30 are now described with reference to a hand-held mobile wireless communications device 1000. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device comprising:
   a plurality of antennas;
   a plurality of wireless transceivers;
   signal processing circuitry; and
   a controller for
      selectively switching said signal processing circuitry to a desired one of said wireless transceivers,
      selectively switching a desired one of said antennas to the desired one of said wireless transceivers, and
      selectively connecting and disconnecting the at least one other one of said antennas to an unused one of said wireless transceivers.

2. The mobile wireless communications device of claim 1 further comprising a plurality of loads; and wherein said controller is also for selectively switching at least one other one of said antennas to at least one of said loads.

3. The mobile wireless communications device of claim 2 wherein said plurality of loads comprises a plurality of impedance elements.

4. The mobile wireless communications device of claim 3 further comprising a printed circuit board (PCB) carrying said plurality of wireless transceivers and said plurality of impedance elements.

5. The mobile wireless communications device of claim 2 wherein said plurality of loads comprises a respective set of loads for each of said antennas.

6. The mobile wireless communications device of claim 2 wherein said plurality of loads have different loading characteristics.

7. The mobile wireless communications device of claim 1 wherein said antennas are connected to a signal ground; and wherein said controller is also for selectively connecting and disconnecting the at least one other one of said antennas to the signal ground.

8. The mobile wireless communications device of claim 1 further comprising a portable housing; and wherein at least one of said plurality of antennas is mounted within said portable housing.

9. The mobile wireless communications device of claim 1 further comprising a portable housing; and wherein at least one of said plurality of antennas is mounted outside said portable housing.

10. The mobile wireless communications device of claim 1 wherein each of said plurality of antennas is for operating over a different operating frequency band.

11. The mobile wireless communications device of claim 1 wherein at least one of said wireless transceivers comprises a cellular wireless transceiver.

12. A mobile wireless communications device comprising:
    a plurality of antennas, each for operating over a different operating frequency band;
    a plurality of wireless transceivers;
    signal processing circuitry;
    a plurality of loads having different loading characteristics; and a controller for
- selectively switching said signal processing circuitry to a desired one of said wireless transceivers,
- selectively switching a desired one of said antennas to the desired one of said wireless transceivers,
- selectively switching at least one other one of said antennas to at least one of said loads, and
- selectively connecting and disconnecting the at least one other one of said antennas to an unused one of said wireless transceivers.

13. The mobile wireless communications device of claim 12 wherein said plurality of loads comprises a plurality of impedance elements.

14. The mobile wireless communications device of claim 12 further comprising a printed circuit board (PCB) carrying said plurality of wireless transceivers and said plurality of impedance elements.

15. The mobile wireless communications device of claim 12 wherein said plurality of loads comprises a respective set of loads for each of said antennas.

16. The mobile wireless communications device of claim 12 wherein at least one of said wireless transceivers comprises a cellular wireless transceiver.

17. The mobile wireless communications device of claim 12 wherein said antennas are connected to a signal ground; and wherein said controller is also for selectively connecting and disconnecting the at least one other one of said antennas to the signal ground.

18. A method for operating a mobile wireless communications device comprising a plurality of antennas, a plurality of wireless transceivers, and signal processing circuitry, the method comprising:
- selectively switching the signal processing circuitry to a desired one of the wireless transceivers;
- selectively switching a desired one of the antennas to the desired one of the wireless transceivers; and
- selectively connecting and disconnecting the at least one other one of the antennas to an unused one of the wireless transceivers.

19. The method of claim 18 wherein the mobile wireless communications device further comprises a plurality of loads; and further comprising selectively switching at least one other one of the antennas to at least one of the loads.

20. The method of claim 19 wherein the plurality of loads have different loading characteristics.

21. The method of claim 18 wherein each of the plurality of antennas is for operating over a different operating frequency band.

22. The method of claim 18 wherein at least one of the wireless transceivers comprises a cellular wireless transceiver.

23. The method of claim 18 wherein the antennas are connected to a signal ground; and further comprising selectively connecting and disconnecting the at least one other one of said antennas to the signal ground.

* * * * *